United States Patent [19]

Fishman

[11] Patent Number: 5,439,128
[45] Date of Patent: Aug. 8, 1995

[54] CONTAINER

[76] Inventor: Avraham Fishman, Klosbachstrasse 110, CH-8032 Zürich, Switzerland

[21] Appl. No.: 182,065

[22] PCT Filed: May 12, 1993

[86] PCT No.: PCT/CH93/00119
§ 371 Date: Mar. 2, 1994
§ 102(e) Date: Mar. 2, 1994

[87] PCT Pub. No.: WO93/23301
PCT Pub. Date: Nov. 25, 1993

[30] Foreign Application Priority Data

May 12, 1992 [CH] Switzerland .................... 1521/92

[51] Int. Cl.$^6$ .............................................. B65D 6/16
[52] U.S. Cl. ......................................... 220/8; 206/218
[58] Field of Search ....................... 220/8, 6; 206/218

[56] References Cited

U.S. PATENT DOCUMENTS 1,913,652  6/1933  Alexander .
2,899,110  8/1959  Parker .

FOREIGN PATENT DOCUMENTS 0287170  10/1988  European Pat. Off. .
2208113   3/1989  United Kingdom .
9204236   3/1992  WIPO .

Primary Examiner—Joseph Man-Fu Moy
Attorney, Agent, or Firm—Speckman, Pauley & Fejer

[57] ABSTRACT

A three-dimensional structure of concentric rings forming a container of plastic material. A plurality of concentric ring-shaped wall elements adjoin each other to form an inner surface of the container. Adjacently adjoining wall elements are connected and inclined with respect to each other. The wall elements are connected to each other with a ring-shaped area of reduced wall thickness, forming a film hinge. The wall elements are inclined so that they can be turned down over adjoining elements to collapse the container.

5 Claims, 2 Drawing Sheets

CONTAINER

BACKGROUND OF THE INVENTION

1. Field of the Invention

This invention relates to a three-dimensional structure of concentric rings, in particular a container of plastic material.

2. Description of Prior Art

Such known containers are relatively rigid. When not in use, they require a relatively large amount of space, unless several of such containers can be placed one inside the other, which is not always possible. This disadvantage has been recognized and a collapsible cup of aluminum or plastic, constructed of a plurality of ring elements, has been assigned for tourists. Such conventional cup can be pushed together to the height of these rings and therefore require less space in the backpack for example. However, it has one great disadvantage of not being absolutely fluid tight, it leaks when put down or even collapses, so that the contents are lost.

SUMMARY OF THE INVENTION

This invention again takes up this known concept by having as one object a structure of the previously mentioned type which can be collapsed and thus which requires little space when not in use, but without having the disadvantages of the conventional containers.

In addition to the mentioned containers, other structures, such as funnels or sunshades for cameras can also have a construction in accordance with this invention.

The three-dimensional structure in accordance with this invention is distinguished in that a plurality of concentric ring-shaped wall elements are disposed adjoining an innermost surface. Respectively adjoining wall elements have different inclinations and are connected with each other via a ring-shaped area of considerably smaller wall thickness in such a way that the wall elements are inclined to a greater degree and can be turned down over adjoining wall elements. The container is collapsible in this way. It is advantageous for all wall elements to be of approximately the same height because in this case, the container has the same height in the collapsed state as these elements. If approximately vertically extending wall elements are disposed between inclined wall elements, there is one advantage that it becomes immediately clear which wall elements can be turned down when the container is collapsed.

Further advantageous embodiments are described by the dependent claims and their operation and purpose will be explained in the following description.

BRIEF DESCRIPTION OF THE DRAWINGS

An exemplary embodiment of the subject of the invention is illustrated in the drawings. Wherein.

DESCRIPTION OF PREFERRED EMBODIMENTS

Figure 1:
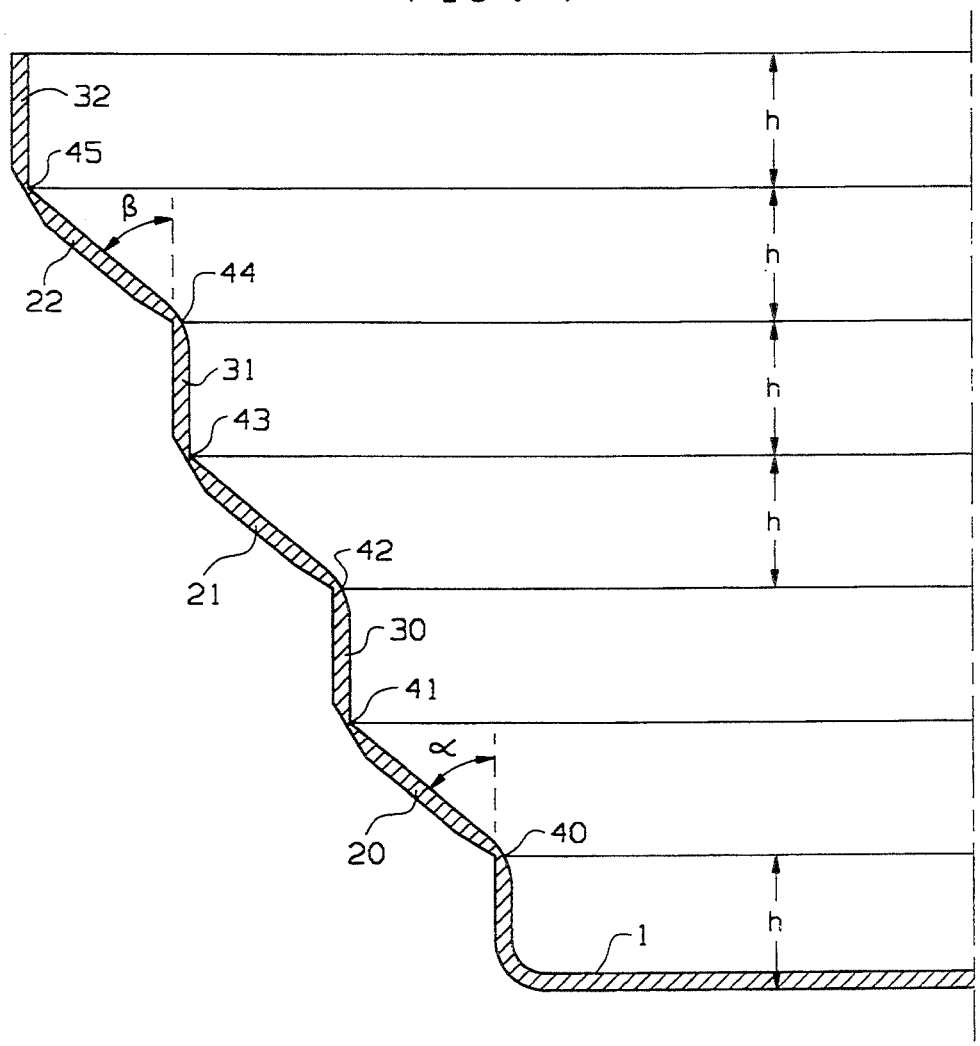
FIG. 1 is a partial cross-sectional view of a round container according to one preferred embodiment of this invention.
Figure 2:
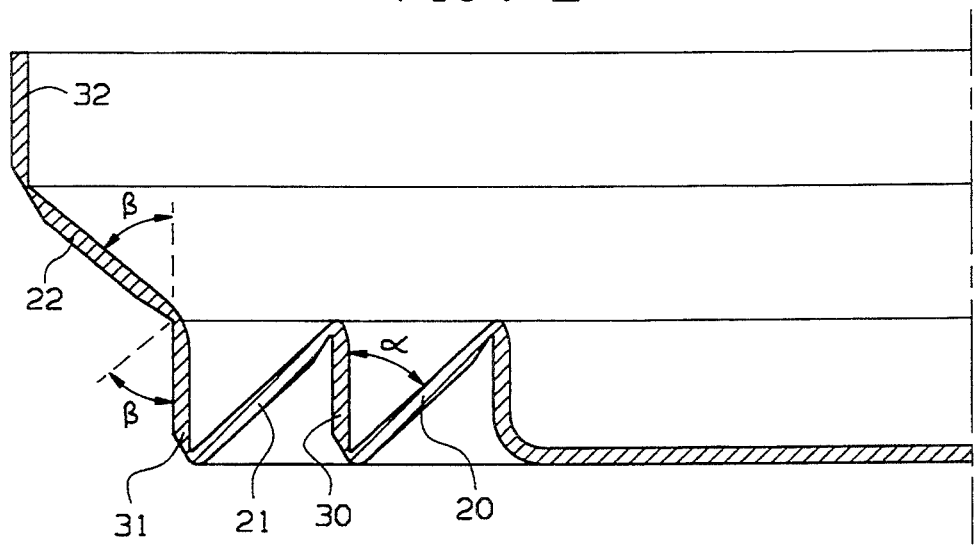
FIG. 2 is a partial cross-sectional view of the container shown in FIG. 1, but in a partially collapsed state.

The innermost surface 1 of the container, namely a dish or cup, is constructed with a bottom, having a rim, the height h of which corresponds to the height h of all ring-shaped wall elements 20–22 and 30–32. The wall elements 20, 21, 22 are inclined at an angle with respect to the vertical, as shown in FIG. 1, while the ring-shaped wall elements 30, 31, 32 extend approximately vertically. The bottom and all ring-shaped wall elements 20–22 are connected by linear-shaped considerably thinner wall elements 40–45 which form film hinges over which an adjoining inclined wall element can be turned. FIG. 2 shows the turned-over position of the wall elements 20 and 21.

In the course of turning over the inclined wall element 20, the vertical wall element 30 was taken along and pulled down to the level of the rim of the bottom. The wall element 31 is taken along in the course of turning over the inclined wall element 21. The inclined wall element 22 and the adjoining vertical wall element 32 are still in the position in accordance with FIG. 1.

The sequence of collapsing can take place arbitrarily and could also start with the elements 22, 32. During the turn-over process, the respective elements must be slightly deformed elastically. In the instant case of a round container, the elements are pushed slightly into ovals, after which the inclined wall elements can be turned over, starting at one place, all the way around. The larger the diameter and the greater the angle of inclination with respect to the vertical, the easier it is to turn over the inclined ring-shaped elements 20–22, wherein they are flipped about the thin, film hinges 40–45. Because the interior and exterior circumferences of the inclined wall elements are the same after turning over than before, their inclination with respect to the vertical also remains the same.

As mentioned above, turning over can be performed easier as the diameter of the inclined wall element is increased, and accordingly it is therefore more difficult with a smaller diameter. This can be taken into account in that the angle $\alpha$, $\beta$ of inclination of the inclined element 20–22 which is to be turned over is increased as the diameter is decreased. In the example shown, the angle $\alpha$, $\beta$ of inclination of the element 20 is greater than the angle $\alpha$, $\beta$ of inclination of the element 22. This angle $\alpha$, $\beta$ of inclination is preserved in the open as well as the collapsed state. If the ring-shaped wall element 22 is turned over, it will in this state also have the angle with respect to the vertical, as indicated in FIG. 2. It is thus possible to determine the sequence of turning over by a suitable selection of the cross-sectional profile and the angle $\alpha$, $\beta$ of inclination of the ring-shaped wall elements.

Figure 3:
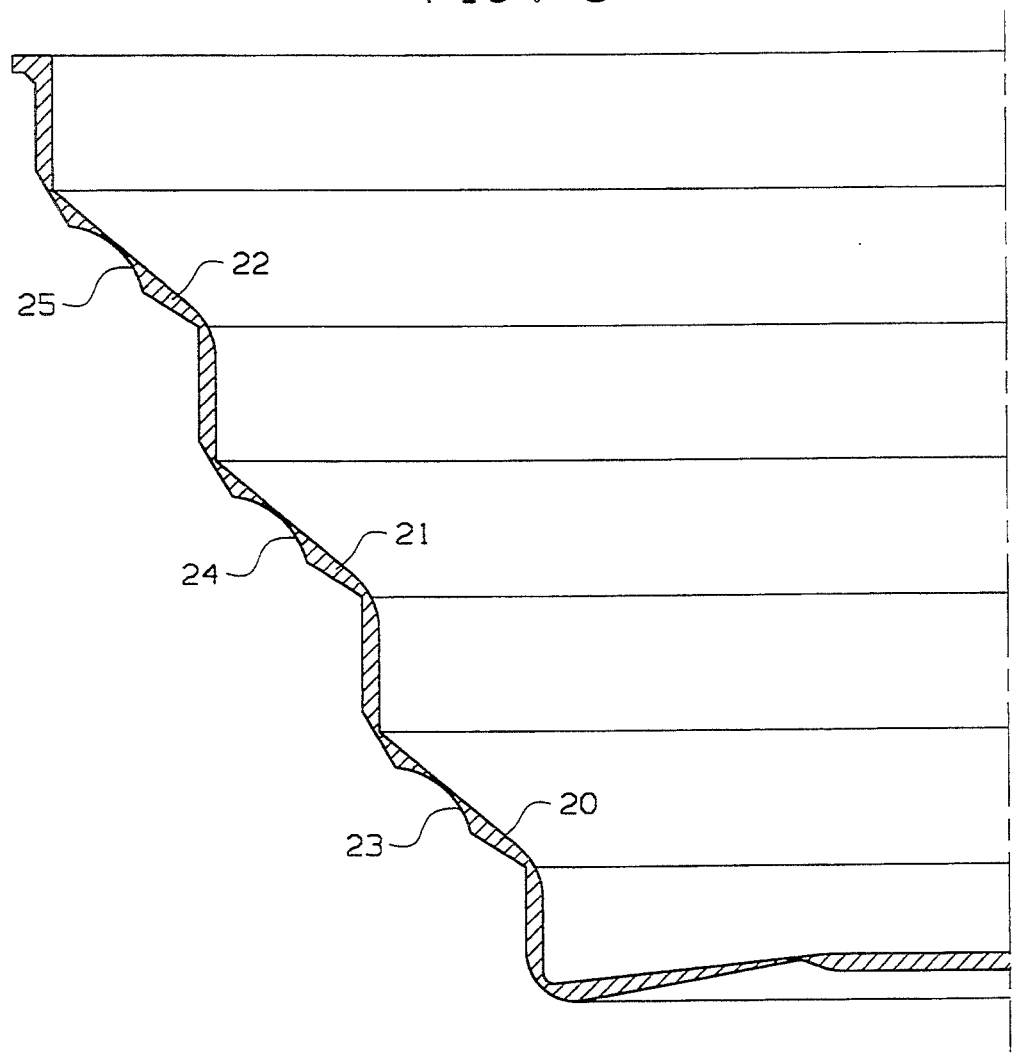
FIG. 3 is a partial cross-sectional view of a round container, according to another preferred embodiment of this invention.

Since the radial distance between two vertical wall elements 30–32 always remains the same, it is necessary to deform the inclined wall element 20, 21, 22 located between them during the turn-over operation. To ease this, it is possible to provide relief grooves 23, 24, 25, as shown in FIG. 3. However, it is also possible to provide more than only one relief groove 23–25 per inclined wall element 20–22.

Finally, it should be mentioned that the vertical wall element 30–32 as well as the inclined wall elements 20–22 are made thinner or beveled in the area of the turn-over line by means of film hinges, in order to make turn-over possible.

Naturally, the space saved because of collapsing becomes greater, as the container becomes larger and higher. In the embodiment shown in the drawings, a round dish is described, but it is also possible to produce oval containers or collapsible containers of other shapes, as long as they have rounded corners. For example, it would be possible to produce a collapsible baby bassinet which could then be easily taken along on trips.

It is possible to form a matching and also collapsible lid for a defined collapsible container, in the same way.

A container widening toward the top is shown and described in the embodiment shown in the drawings. It is also easily possible to provide a collapsible container according to this invention, which tapers inward toward the opening by having the inclined wall elements 20-22 inclined toward the interior instead of the exterior container.

In accordance with this invention, it is also possible to construct a collapsible container which is widest at the center. Such a container preferably has inwardly inclined wall elements 20-22 in the upper area and outwardly inclined wall elements 20-22 in the lower area. Turning over and collapsing takes place in the direction toward the central, widest part of the container.

I claim:

1. A three-dimensional structure of concentric rings forming a collapsible container of plastic material with an inner surface (1) and a plurality of adjoining concentric, ring-shaped wall elements, wherein respectively adjoining said wall elements are positioned at an angle of inclination with respect to each other, the collapsible container comprising: inclined wall elements (20, 21, 22) of said wall elements each respectively disposed between two generally vertical wall elements (30, 31, 32) of said wall elements, each said adjoining wall elements (20, 30; 21, 31; 22, 32) respectively connected with respect to each other with a ring-shaped area (40–45) of reduced wall thickness, whereby said inclined wall elements (20, 21, 22) can be turned down over adjoining said vertical wall elements (30, 31, 32) and wherein a corresponding said angle of inclination of each of said inclined wall elements (20, 21, 22) increases as a mean diameter of each said inclined wall element (20, 21, 22) decreases.

2. A container in accordance with claim 1, wherein all of said wall elements are of approximately an equal height.

3. A container in accordance with claim 1, wherein said ring-shaped areas (40–45) are embodied as film hinges.

4. A container in accordance with claim 1, wherein each of said inclined wall elements (20, 21, 22) has a relief groove (23, 24, 25).

5. A container in accordance with claim 1, further comprising a lid having a structure corresponding to the container.

* * * * *